UNITED STATES PATENT OFFICE.

ROBERT GNEHM AND JAKOB SCHMID, OF BASLE, SWITZERLAND, ASSIGNOR TO THE SOCIETY OF CHEMICAL INDUSTRY IN BASLE, OF SAME PLACE.

RED DYE.

SPECIFICATION forming part of Letters Patent No. 493,583, dated March 14, 1893.

Application filed August 25, 1892. Serial No. 444,112. (Specimens.)

*To all whom it may concern:*

Be it known that we, ROBERT GNEHM and JAKOB SCHMID, citizens of Switzerland, residing at Basle, Switzerland, have invented new and useful Improvements in the Production of a Red Azo Coloring-Matter or Dye-Stuff, of which the following is a specification.

Our invention relates to the production of a red coloring matter for dyeing wool, which is obtained by the combination of one molecular proportion of diazotized mono-nitro-benzidine, one molecular proportion of salicylic acid and one molecular proportion of alpha-naphthol-alpha-mono-sulpho-acid of Nevile and Winther.

In the preparation of our new coloring matter we use mono-nitro-benzidine which is obtained by nitrification of a sulphuric solution of benzidine with one equivalent of a mixture of nitric acid and sulphuric acid and which, according to its characteristics, is to be considered as mono-ortho-nitro-para-diamido-diphenyl of the formula:

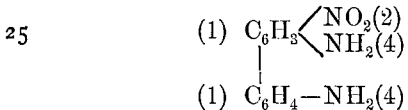

In carrying out our invention practically we proceed as follows: 3.425 kilos of mono-nitro-benzidine are dissolved in thirty to thirty-five liters of water and 4.5 kilos of muriatic acid. The solution is cooled down to 4° centigrade, mixed with four kilos of muriatic acid and then 2.1 kilos of sodium nitrite dissolved in ten liters of water are added in the course of about one hour. The aqueous solution of the diazo-compound thus formed is filtered and introduced into a solution of 2.2 kilos of salicylic acid; eight kilos of soda; twenty liters of water at a temperature of from 0° to 5° centigrade. After standing for some hours the formation of the intermediate product is completed and a cooled solution of four kilos of alpha-naphthol-alpha-sulphonate of sodium (Nevile and Winther) is added. The formation of the dyestuff begins immediately and is complete after twelve hours' repose. The coloring matter thus obtained is separated by warming the solution and by precipitating with common salt. It is filtered off and dried. It is a red-brown powder difficultly soluble in cold water and alcohol and readily soluble in warm water. It is insoluble in benzine and has the following constitution:

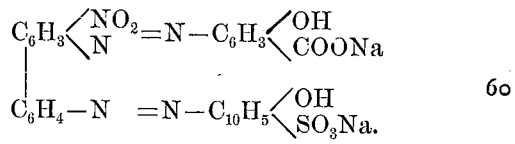

The aqueous solution is yellow-red and dyes wool in an acid bath bright scarlet-red tints. Dark red shades are obtained on wool mordanted with chromium salts. The tints resist very well the action of air, soap, fulling, chlorine and sulphurous acid.

What we claim as new, and desire to secure by Letters Patent, is—

1. The process of producing a new red azo-dye which consists in combining molecular proportions of diazotized mono-nitro-benzidine, salicylic acid and alpha-naphthol-alpha-mono-sulpho-acid (Nevile and Winther) and then precipitating with common salt, substantially as described.

2. The new red azo coloring matter which can be derived from diazotized mono-nitro-benzidine, salicylic acid and alpha-naphthol-alpha-mono-sulpho-acid (Nevile and Winther) and which is a red-brown powder difficultly soluble in cold water and alcohol, insoluble in benzine, but readily soluble in warm water with a yellow-red color.

In testimony whereof we have hereunto set our hands in the presence of two subscribing witnesses.

ROBERT GNEHM.
JAKOB SCHMID.

Witnesses:
GEORGE GIFFORD,
F. WATTER.